I. ISRAEL.
PASTRY SHAPING DEVICE.
APPLICATION FILED JAN. 22, 1919.
1,379,987.
Patented May 31, 1921
10 SHEETS—SHEET 1.
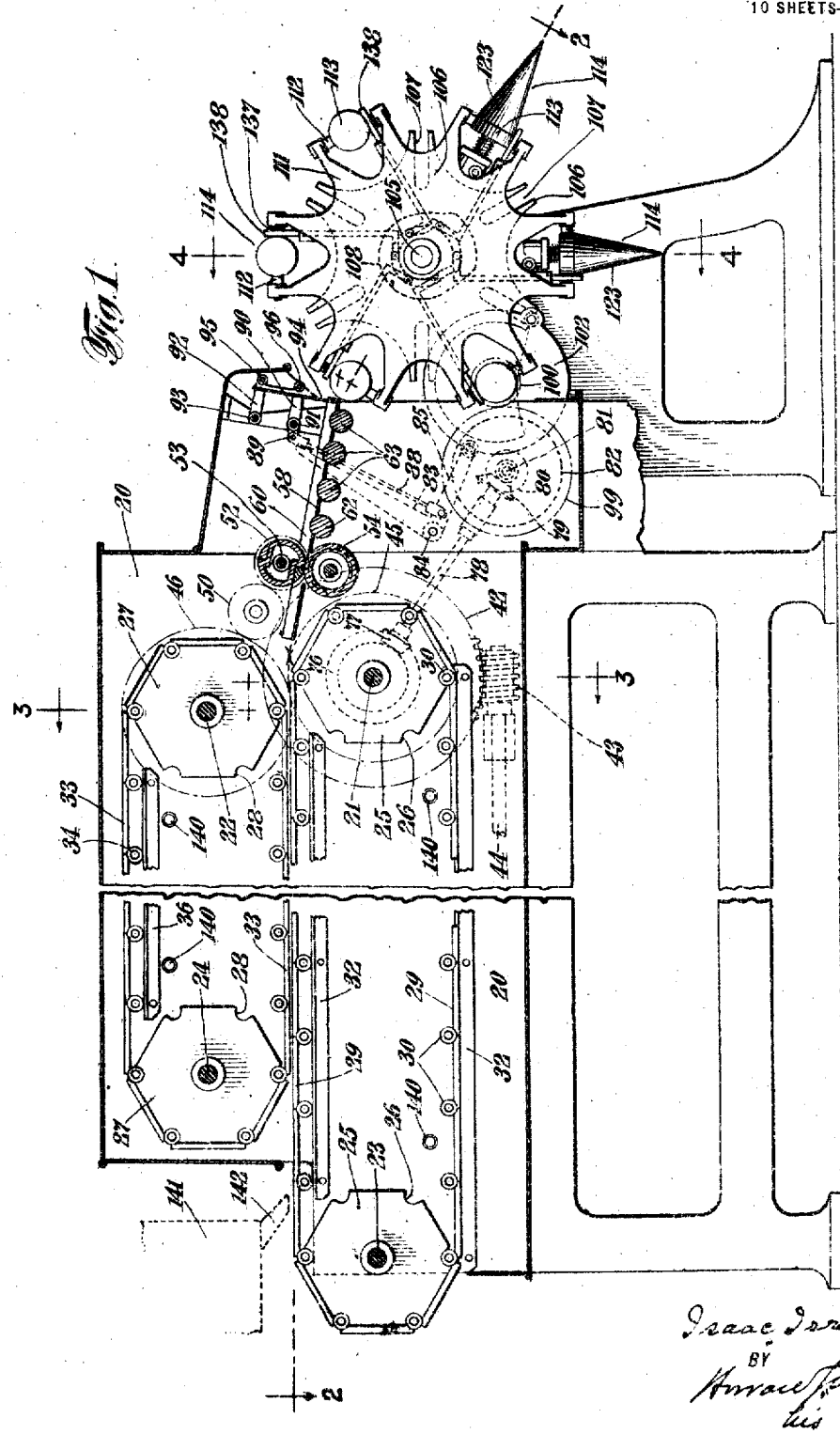
INVENTOR
Isaac Israel
BY
Horace Freeman
his ATTORNEY

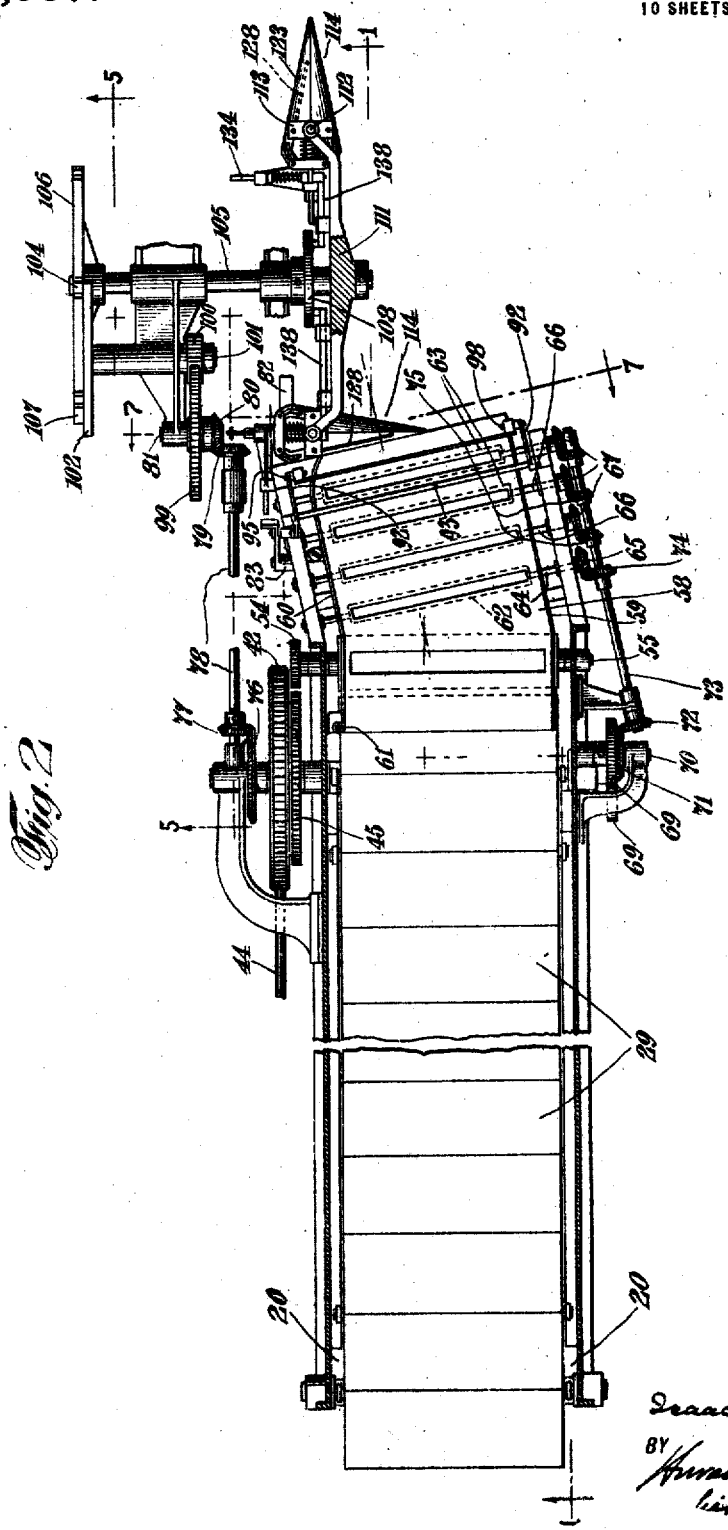

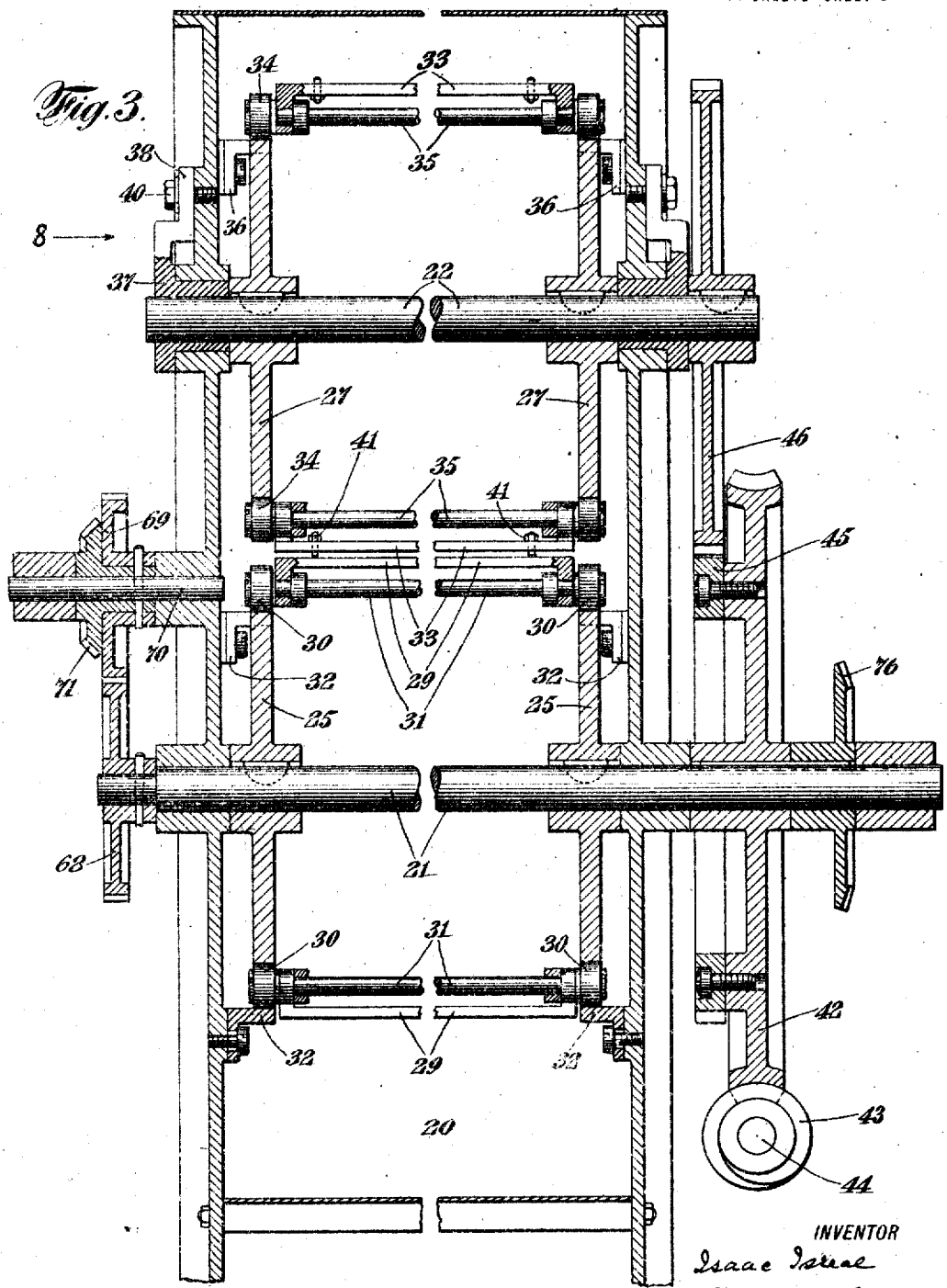

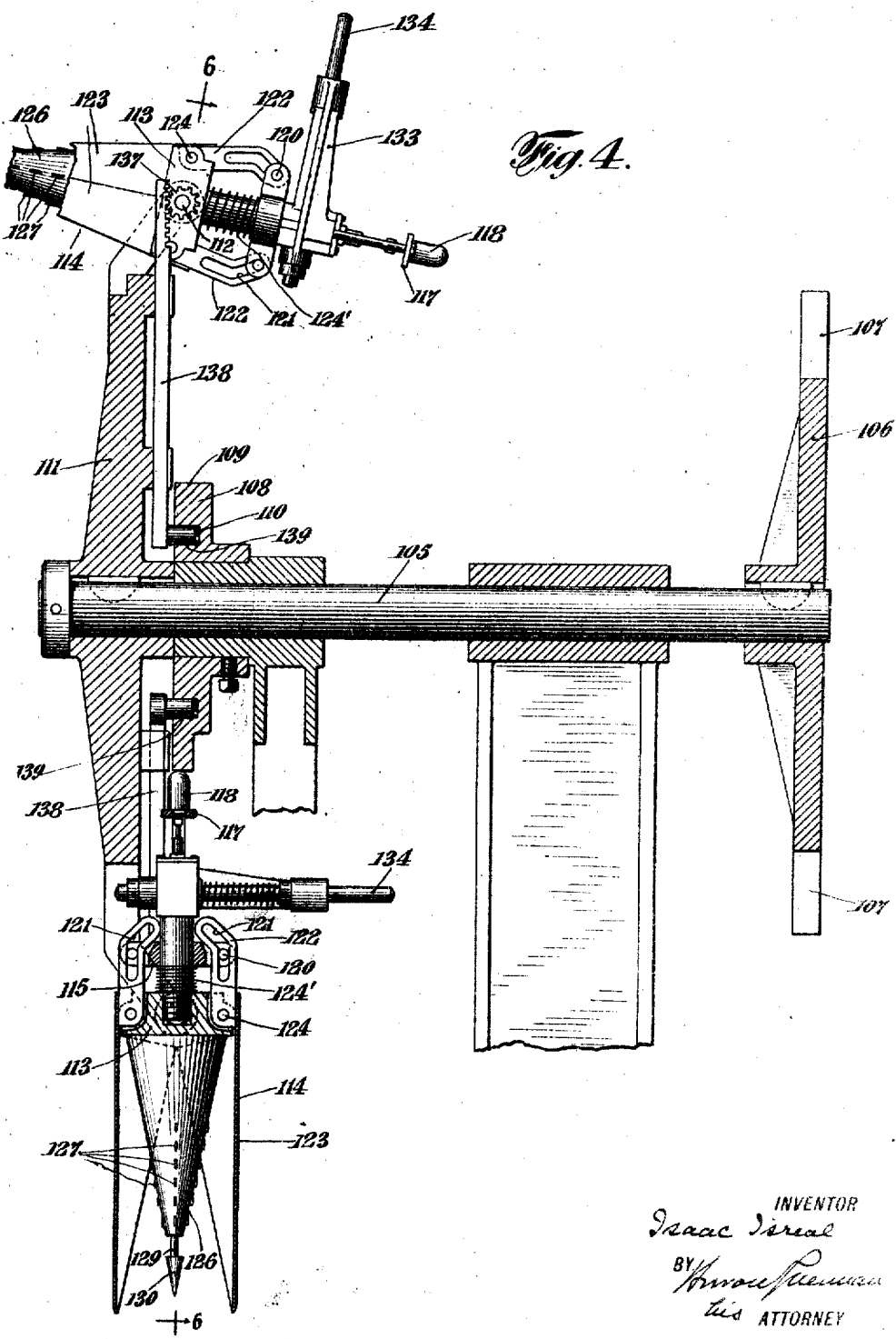

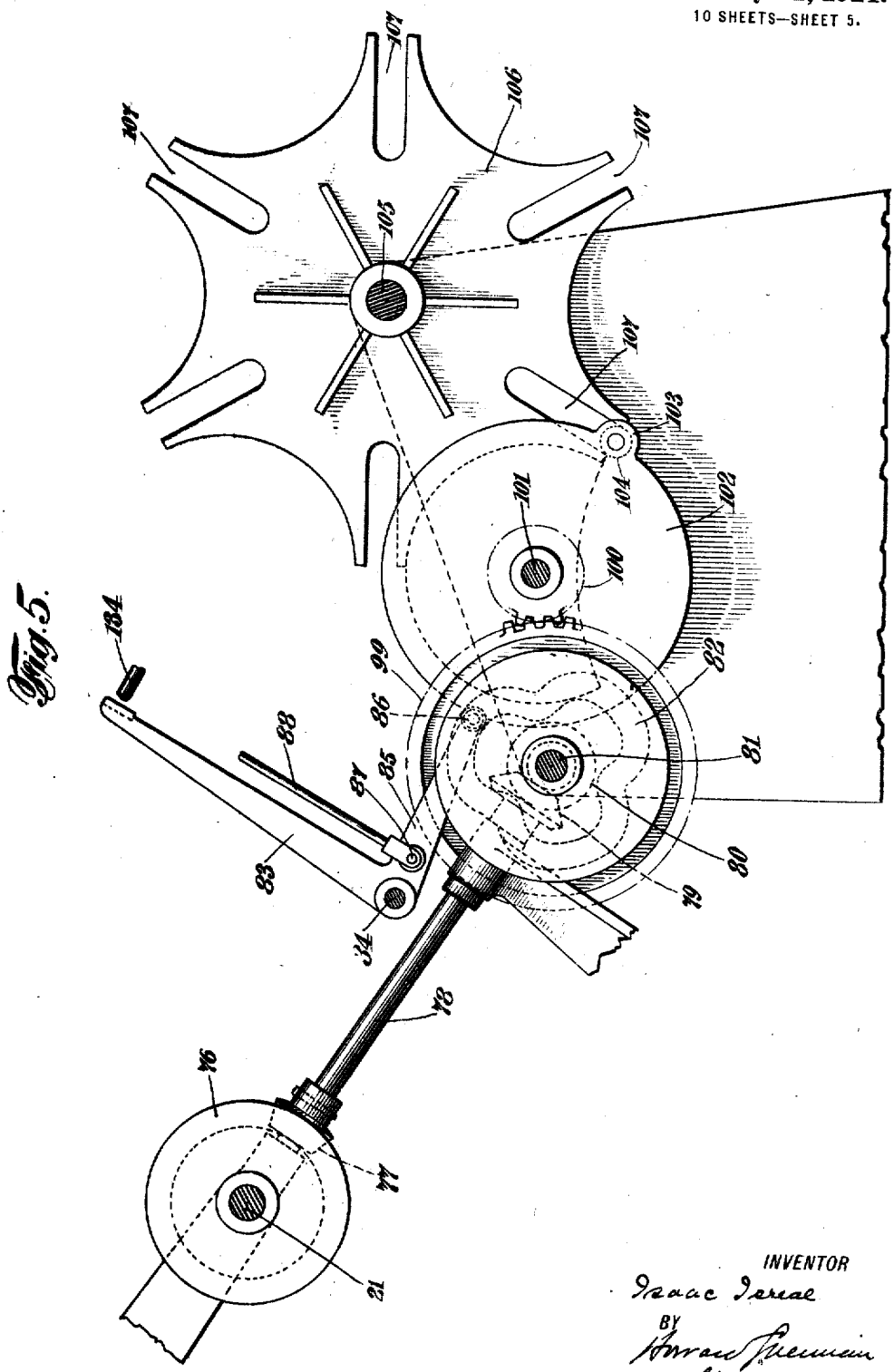

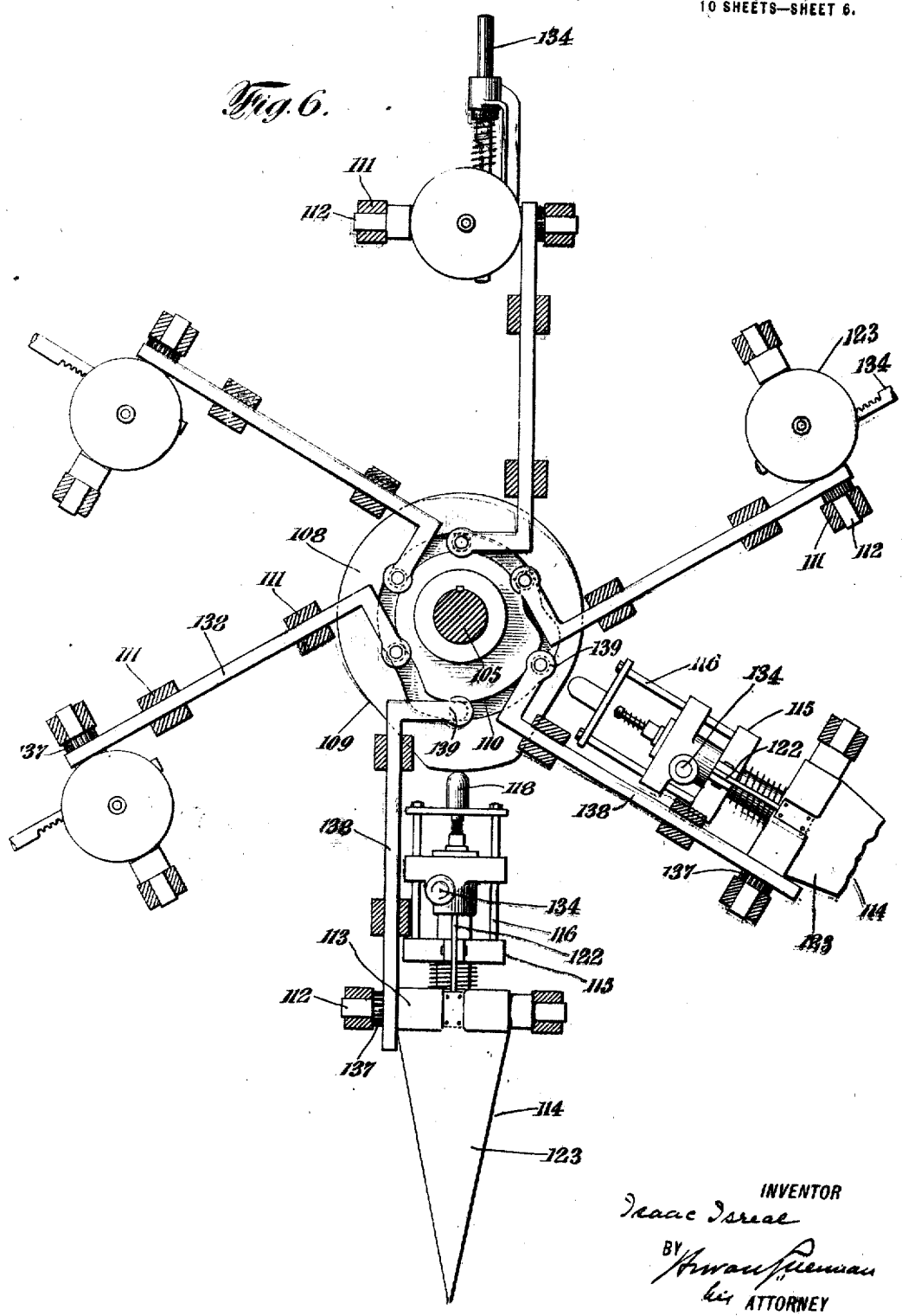

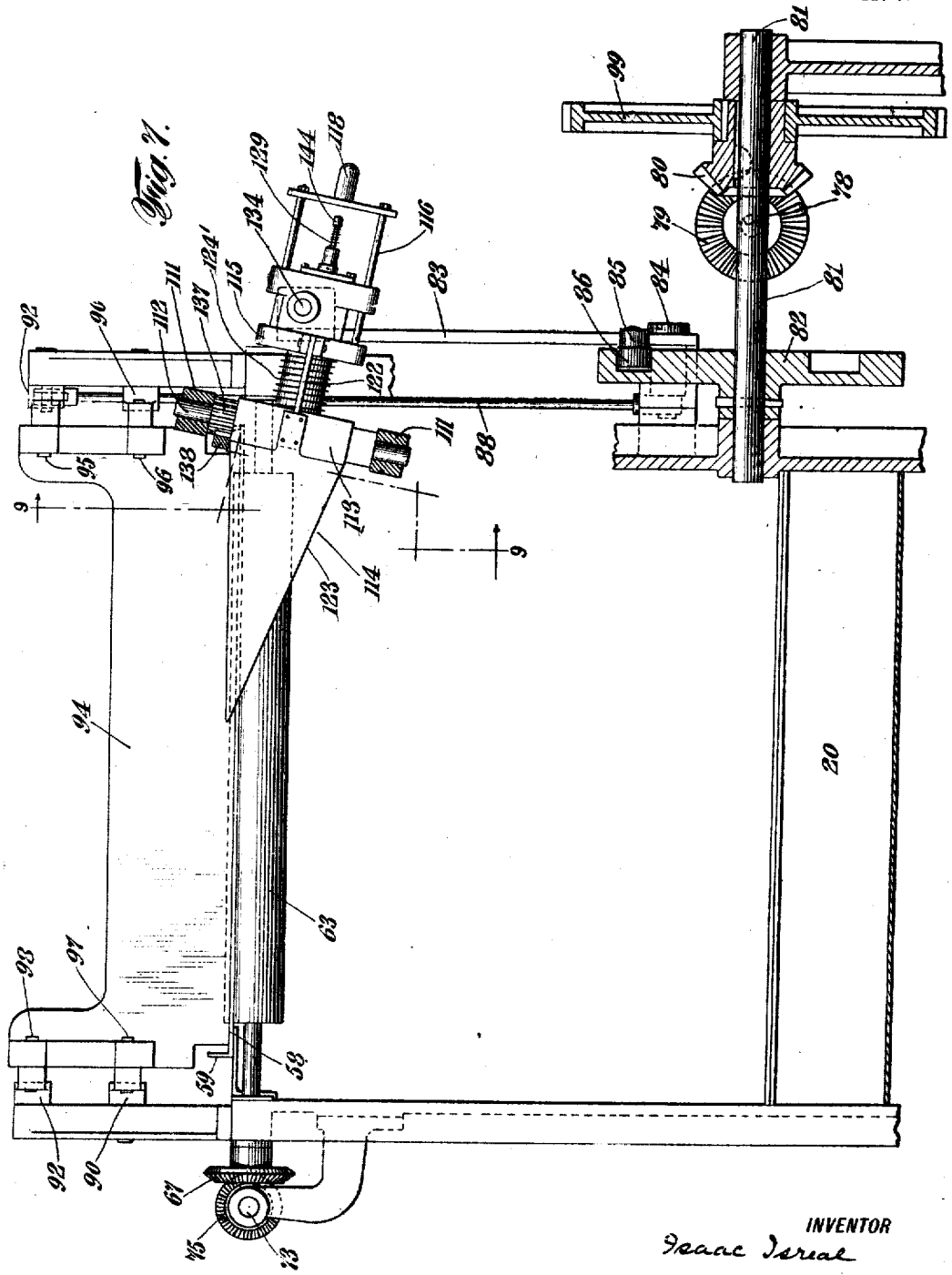

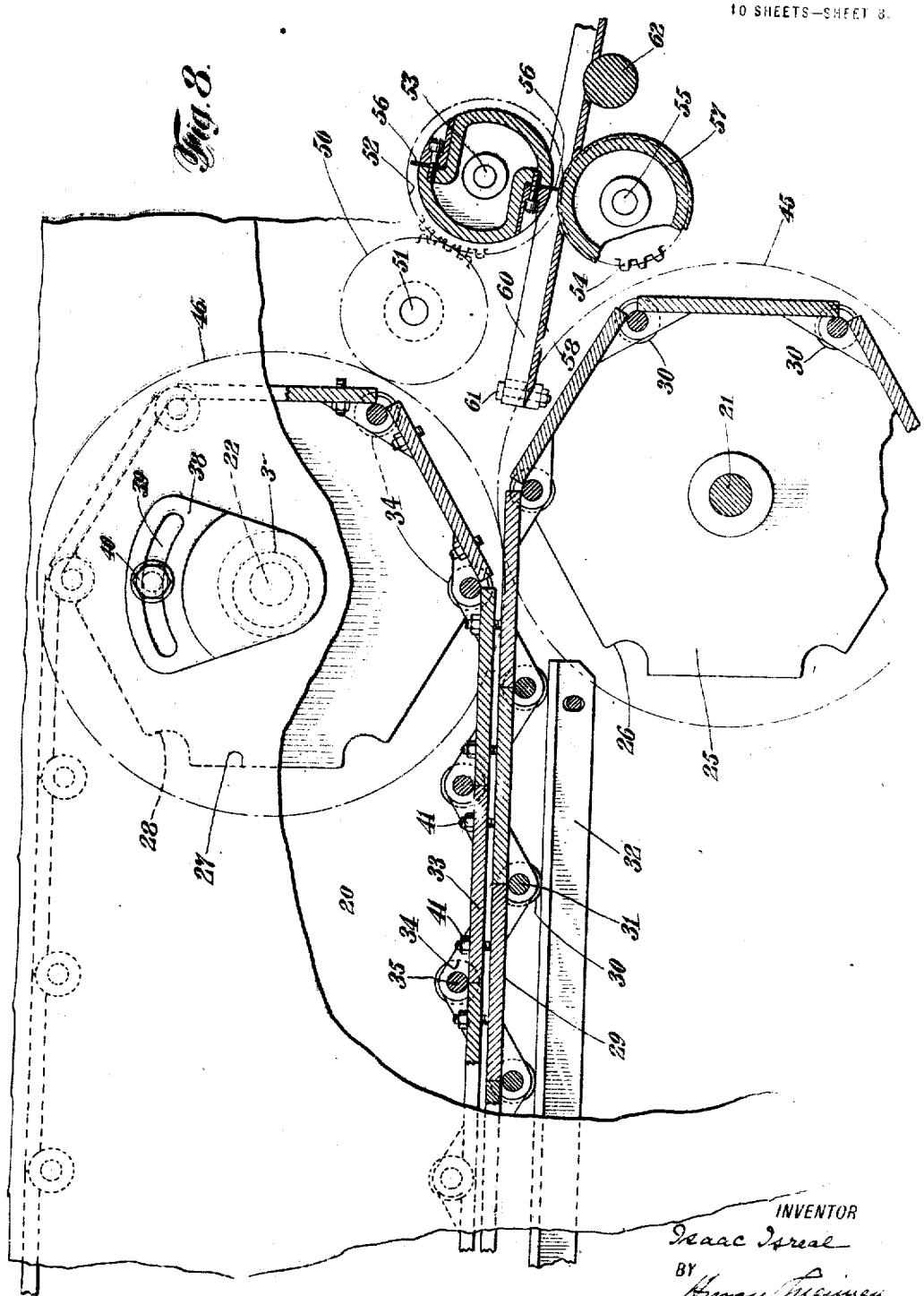

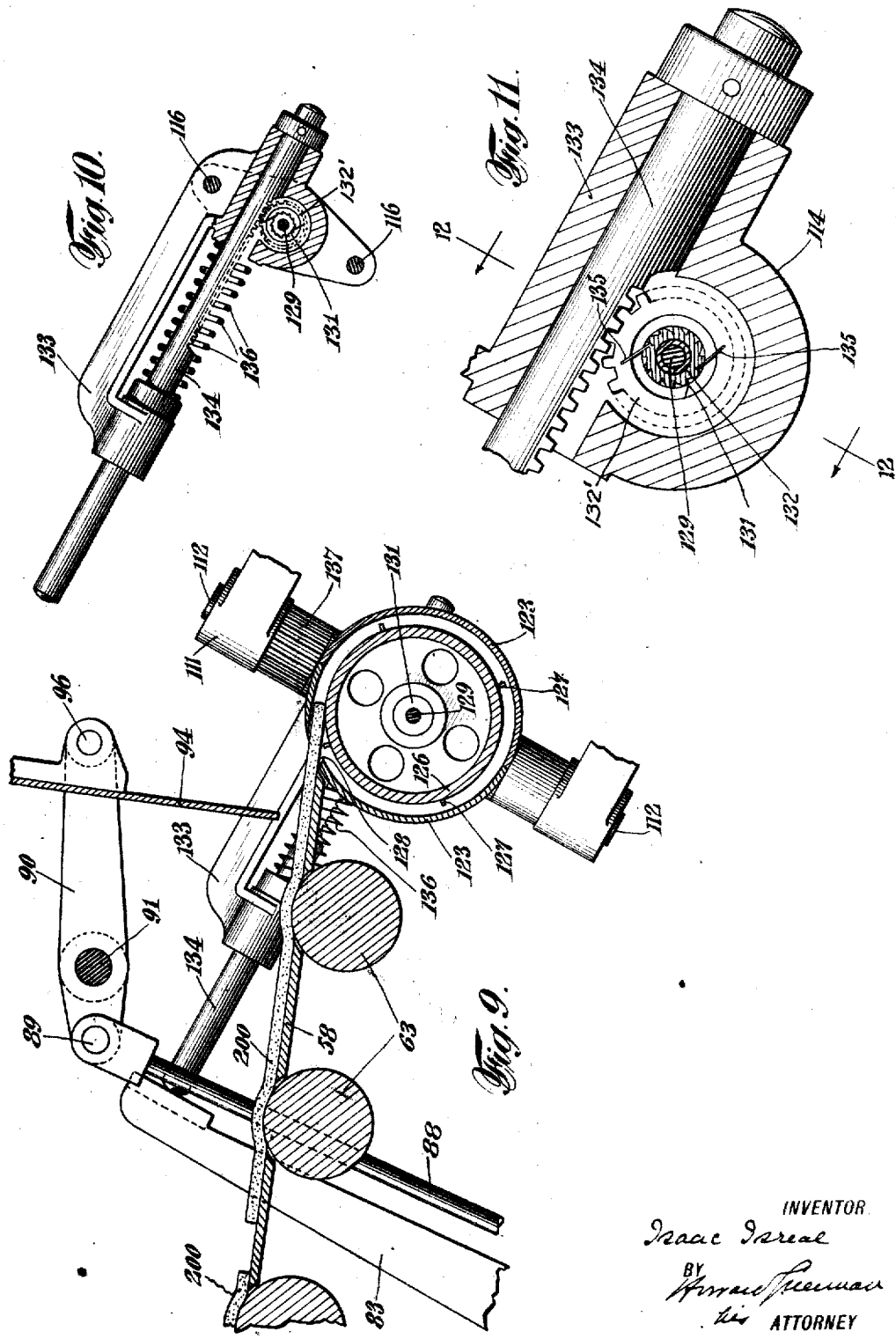

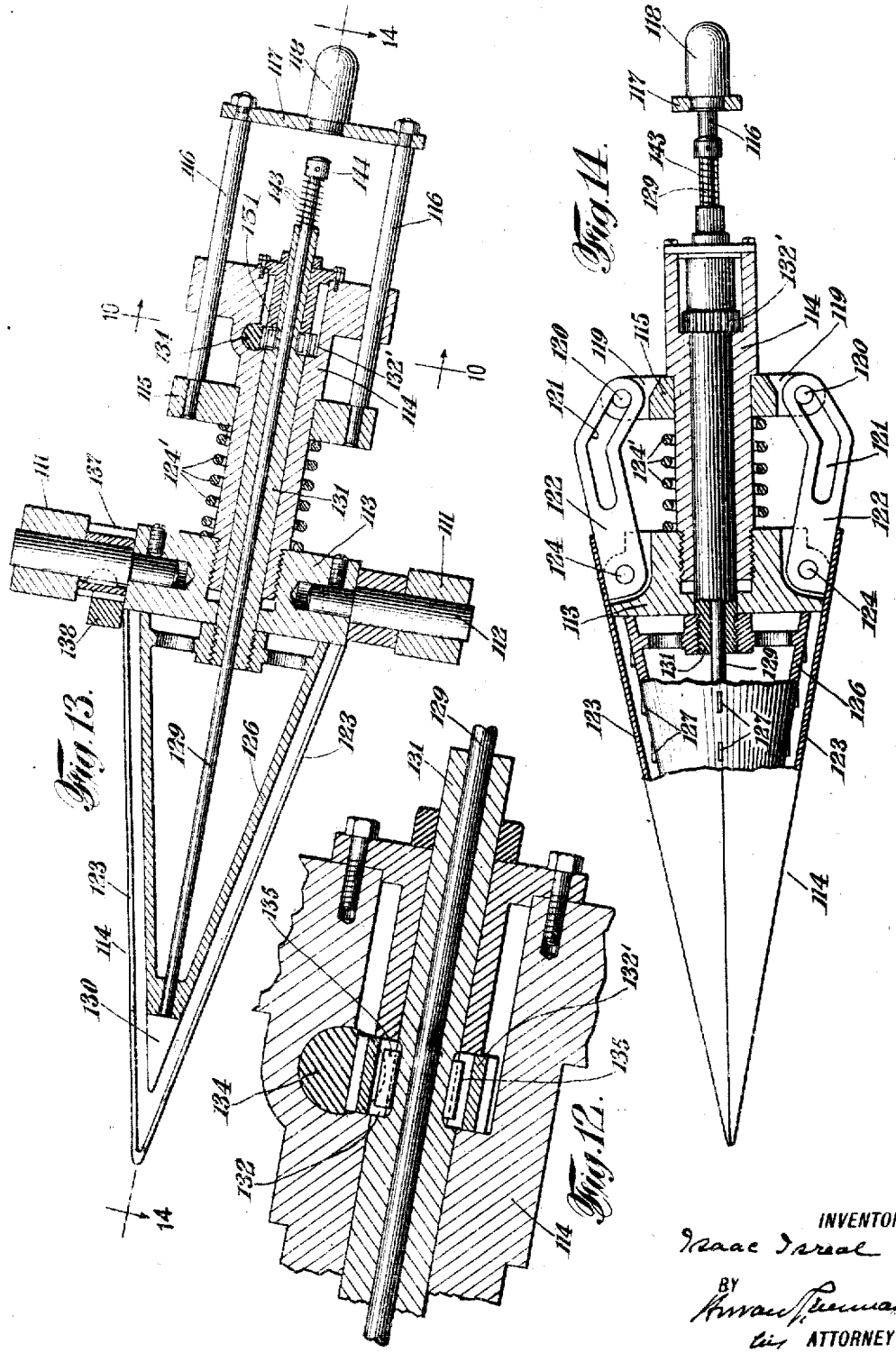

UNITED STATES PATENT OFFICE.

ISAAC ISRAEL, OF NEW YORK, N. Y., ASSIGNOR OF ONE-HALF TO SUCCESS CONE CO., INC., OF NEW YORK, N. Y., A CORPORATION OF NEW YORK.

PASTRY-SHAPING DEVICE.

1,379,987.  Specification of Letters Patent.  Patented May 31, 1921.

Application filed January 22, 1919. Serial No. 272,423.

*To all whom it may concern:*

Be it known that I, ISAAC ISRAEL, a citizen of the United States, residing in the city of New York, county of New York, borough of Manhattan, and State of New York, have invented certain new and useful Improvements in Pastry-Shaping Devices, of which the following is a full, clear, and exact specification.

My invention relates to pastry shaping devices and refers particularly to the production of ice-cream cones.

The object of my invention is a device whereby ice-cream cones may be made automatically and economically.

One usually employed method of producing dough-forms of the described character is to form the dough, or batter, into a practically circular form, partially bake it, fold the dough into a cone shape by hand and then complete the baking operation.

This process has many manufacturing and commercial disadvantages. It is very slow of operation. The hot dough-forms burn and blister the hands of the operator during the forming period. It is impossible to produce cones of a uniform shape, resulting in increased breakage when nested for shipment as well as in non-uniformity of appearance. There is considerable wastage in the cone forming operation. The production is irregular and the output uncertain.

Another method of producing dough-forms is to form them by the ordinary molding process, but this method also possesses many of the disadvantages mentioned above.

The device of my invention overcomes all of these difficulties and presents a machine whereby ice-cream cones may be made automatically, rapidly and of uniform size and shape. It overcomes the necessity of hand work during the forming operation, thus insuring increased production under sanitary conditions. The operations are mechanical and automatic from the dropping of the batter to the production of the cone, thus allowing a maximum production of a uniform product.

In the accompanying drawings, forming a part of this application, illustrating one form of the device of my invention, similar parts are designated by similar numerals.

Figure 1 is a broken side-plan view of one form of my device, taken in the direction of the arrows 1—1 of Fig. 2.

Fig. 2 is a section through the line 2—2 of Fig. 1.

Fig. 3 is a section through the line 3—3 of Fig. 1.

Fig. 4 is a section through the line 4—4 of Fig. 1.

Fig. 5 is a section through the line 5—5 of Fig. 2.

Fig. 6 is a diagrammatic section through the line 6—6 of Fig. 4.

Fig. 7 is a section through the line 7—7 of Fig. 2.

Fig. 8 is a view in the direction of the arrow 8 of Fig. 3, partly broken away.

Fig. 9 is a section through the line 9—9 of Fig. 7.

Fig. 10 is a section through the line 10—10 of Fig. 13.

Fig. 11 is an enlarged view of a portion of Fig. 10.

Fig. 12 is a section through the line 12—12 of Fig. 11.

Fig. 13 is an enlarged cross-section of the cone-forming device.

Fig. 14 is a section through the line 14—14 of Fig. 13.

The device as illustrated comprises the receptacle, or chamber, 20, opposite sides of which support the revoluble shafts 21, 22, 23 and 24. Fixedly attached to the shafts 21 and 23 are the flange side members 25, 25, having a series of recesses 26, 26 for purposes to be described later. Fixedly attached to the shafts 22 and 24 are the flange side members 27, 27 having a series of recesses 28, 28. Situated around the flange members 25, 25, 25, 25 is a link-belt, or conveyer, 29, the links of which are pivotal upon the rollers 30, 30 revoluble upon the shafts 31, 31, 31, 31, the rollers 30, 30 fitting in the recesses 26, 26 of the flange ends 25, 25. Fastened to each side of the receptacle 20 are two tracks 32, 32 upon which the rollers 30, 30 abut, supporting the link-belt during its revolution. Situated among the flange members 27, 27, 27, 27 is a link-belt, or conveyer, 33, the links of which are pivoted upon the rollers 34, 34, revoluble upon the shafts 35, 35, 35, 35, the rollers 34, 34 fitting into the recesses 28, 28 of the flange ends 27, 27. Situated upon each side wall of the chamber 20 is a track 36, upon which the rollers 34, 34 abut supporting the link belt 33 during its revolution. Shafts 22 and 24 are supported in cam-bushings which comprise the member 37 having the extended member 38 containing a slot 39, Fig. 8. A screw-bolt 40 passes through the slot 39 and threads within the wall of the chamber 20. The shafts 22 and 24 are raised or lowered, by loosening the bolt 40, revolving the member 38 and then setting the bolt 40 to maintain the shafts in the proper position. In order to prevent the lower portion of the belt 33 from sagging between the flanges 27, 27 of the shafts 22 and 24 and to maintain the belts 33 and 29 at equal distance from each other, a series of threaded bolts 41, 41, are threaded in openings in the belt 33 and extend downwardly to abut upon the belt 29. Fixedly attached to the shaft 21 is the gear wheel 42, meshing with the worm gear 43 which is fixedly attached to the shaft 44 connected with a source of revoluble power. Fixedly attached to the gear wheel 42 is the gear wheel 45 meshing with the gear wheel 46 fixedly attached to the shaft 22, the teeth of the gears 45 and 46 being deep enough to allow of mesh when the shaft 22 is raised to its highest desired position. When the shaft 44 is revolved, revoluble motion is imparted to the worm 43, the gears 42, 45 and 46 and thus to the flanges 25, 26, 27, 27, the ratio of gearing being such that the belts 29 and 33 move with equal velocity.

The gear wheel 46 is meshed with the intermediate gear 50, fixedly attached to the revoluble shaft 51, which, in turn, is meshed with the gear wheel 52 fixedly attached to the revoluble shaft 53, the gear 52 meshing with the gear 54 fixedly attached to the revoluble shaft 55. The shaft 53 carries a series of cutting blades 56, 56, abuttable upon the roller 57 carried by the shaft 55. A platform 58 has the upwardly extended side 59 and the upwardly extended side 60, the latter being hinged at 61 to allow of horizontal movement. The platform has a series of longitudinal openings through which extend the rollers 57, 62, 63, 63, 63. The roller 62 is fixedly attached to the revoluble shaft 64 having a miter gear 65 at its one extremity. The rollers 63, 63, 63 are fixedly attached to the revoluble shafts 66, 66, 66 having bevel gears 67, 67, 67 at the ends thereof.

Attached to the shaft 21 is a gear wheel 68 meshing with the gear wheel 69 fixedly attached to the stub shaft 70. Fixedly attached to the shaft 70 is the bevel gear 71, meshing with the bevel gear 72, fixedly attached to the revoluble shaft 73. The shaft 73 carries a fixed miter gear 74 meshing with the gear 65, and fixed bevel gears 75, 75, 75 meshing with the gears 67, 67, 67, Figs. 3 and 2.

Fixedly attached to the shaft 21 is the bevel gear 76 meshing with the bevel gear 77, fixedly attached to the revoluble shaft 78. The shaft carries the fixedly attached bevel gear 79, meshing with the bevel gear 80, fixedly attached to the revoluble shaft 81. Fixedly attached to the shaft 81 is the run-way cam 82. A bell-crank lever 83 is attached to the rock-shaft 84, the one arm 85 of the crank lever 83 having a roller 86 running within the run-way of the cam 82.

Pivotally attached to the arm 85 at 87 is the extended rod 88. The rod 88 is pivotally attached at 89 to the link member 90 which is revoluble around the shaft 91. An arm 92 is revoluble around the fixed shaft 93. A gate 94 is carried by and revoluble around the stud shafts 95 and 96 of the arms 90 and 92, the other end of the gate being similarly carried by, and revoluble around, the stud shafts 97 and 98. The downward movement of the rod 88 therefore raises the gate 94.

Fixedly attached to the revoluble shaft 81 is the gear wheel 99 meshing with the gear wheel 100, fixedly attached to the revoluble shaft 101. Fixedly attached to the shaft 101 is the wheel 102, having an extended arm 103, carrying the revoluble wheel 104. Fixedly attached to the revoluble shaft 105 is the wheel 106, having the recesses 107, 107, 107 into which the wheel 102 may be inserted during the revolution of the wheel 102, thus giving the wheel 106 an intermittent motion.

The shaft 105 passes through a stationary cam member 108, having a circumferential cam face 109 and a cam run-way 110.

Fixedly attached to the shaft 105 is the armed member 111. Situated with each pair of arms of the member 111 is a cone-forming device.

The cone-forming, or cone-shaping, device comprises an annular member 113, having the extended shafts 112, 112, revolving within the arms of the member 111. A hollow conical member 114 is carried by the member 113. Slidable over the member 114 is the annular member 115 connected by the bars 116, 116 to the member 117, having the projection 118. Each of a series of projections 119, 119 of the member 115 has a bolt 120 slidable within the slot 121 of a member 122. The other extremity of each member 122 is fixedly attached to a triangular curved leaf 123 and revolubly pivoted at 124. The leaves 123, 123 are of such a size and shape as to form a hollow cone-shaped member when closed together. The inward movement of the member 115 causes the bolt 120 to move along the slot 121 of the member 122, causing the leaves 123, 123 to open as shown in the lower portion of Fig. 4, the spring 124' abutting upon the members 113 and 115, closing the leaves when the inward pressure upon 115 is removed. This movement is accomplished at predetermined periods by the movement of the member 118 around the circumferential surface of the cam 108, against which it is retained by the spring 124. The hollow cylindrical member 126, carried by the revoluble member 131, has sides parallel with the leaves 123, 123 in their closed condition and is spaced therefrom and carries a series of small projections 127, 127. One of the leaves 123 has a longitudinal opening 128 (Fig. 9) for purposes described later. Within the member 131 is a slidable bar 129, having a conical end 130. A spring 143 returns the rod 129 to its original position when pressure is removed from the rod head 144. The member 129 carries the fixedly attached ratchet wheel 132, Fig. 11. Slidable within the supporting member 133 is the toothed bar 134, meshing with the revoluble wheel 132. Dogs 135, 135 prevent the return movement of the ratchet wheel 132 and a spring 136 causes the return movement of the bar 134 when pressure is removed. The inward movement of the bar 134, will revolve the ratchet wheel 132, the member 131 and the cone 126. Fixedly attached to each member 113 is a ratchet wheel 137. Carried by the member 111 is a series of toothed bars 138, 138, each one of which meshes with a ratchet wheel 137. The inward extremity of each bar 138 carries a roller 139 movable within the run-way 110 of the cam 108. As the arms 138 revolve, they are given a reciprocating movement thus revolving the cone-formers from a horizontal position to a vertical one and then to a horizontal position for purposes described later.

The sides of the chamber 20 form a heating chamber, heated by means of gas pipes 140, 140.

A receptacle 141 contains a pastry dough which is deposited upon the belt 29 by the dough depositor 142 in the form of a series of practically circular deposits, slightly overlapping each other, thus forming a continuous chain, or belt, of these dough forms.

The operation of the device is as follows:—

The belts, or conveyers, 29 and 33 are spaced a predetermined distance from each other by means of the shafts 22 and 24 and the bolts 41, 41 and revolved by means of power transmitted to the worm shaft 44. The chamber 20 is heated by means of the gas pipes 140, 140. When the required heat is obtained, dough paste is dropped upon the belt 29 through the dropper 142, the dough being in the condition of a continuous strip of slightly overlapping circular forms. The dough is pressed to the required thickness by the belts 29 and 33 which convey it, during its partial baking to a palatable condition caused by the heated belts to the chute 58 where it is cut into desired lengths by the knives 56, 56. The cut dough is then passed by means of the revolving rollers 62, 63, 63, 63, the dough abutting upon the gate 94. The gate 94 is then raised by the chain of gears 76, 77, 79, 80, the cam 82, the lever 88 and the link system 90, 92. At this instant a cone-forming, or cone-shaping device is in a horizontal position, the opening 128 of one of the leaves 123 being adjacent to and parallel with the chute 58. The dough 200 is then forced by the rollers 63, 63 into the opening 128 and between the leaf 123 and the cone-shaped member 126. The arm 83, operated by the cam 82, forces the rod 134 inwardly revolving the member 131 and the cone 126, the projections 127, 127 gripping the dough and drawing it within the space between the leaf 123 and the cone 126, thus forming the dough into a cone-shape. The member 111, carrying the cone-forming members, is then given a partial revolution by means of the wheel 102, presenting the following cone-forming member for the reception of the next piece of dough. When the loaded cone-forming member has been subjected to two of these intermediate movements, it is revolved from a horizontal position to a position at right angles to its former position by means of the cam runway 110, the arm 138 and the ratchet wheel 137. When the cone-forming device is in its lowest position of revolution, the member 118 is pushed inwardly by the revolution of the cam 108, this motion first opening the leaves 123, 123 through the medium of the bolts 120, 120 and the members 122, 122, the further inward movement of the member 117 forcing the pin 129, the conical end 130 of which forces the dough cone from the cone-forming device, the dough cone dropping into a suitable receptacle. The next revolution of the member 102 revolves the cone-forming device, brings the rod 129 into its original position, closes the leaves 123, 123 and revolves the cone-forming device into a horizontal position to receive a new lot of dough.

From the above it is evident that the device of my invention automatically forms, or shapes, cone-shaped dough forms from the dough in bulk, without manual handling of the dough.

I do not limit myself to the particular size, shape, number or arrangement of parts as described and shown, all of which may be varied without going beyond the scope of my invention as described and claimed.

What I claim is:—

1. In a device of the character specified, in combination, a dough-heating member, means for heating the dough-heating member, means for depositing a strip of dough upon the dough-heating member, means for cutting the dough strip into predetermined lengths, a dough-shaping device, means for transferring the cut dough into the dough-shaping device and means for removing the shaped dough from the dough-shaping device.

2. In a device of the character specified, in combination, a movable dough-carrying member, means for heating the dough-carrying member, means for moving the dough-carrying member, means for depositing a strip of dough upon the dough-carrying member, means for cutting the dough strip into predetermined lengths, a dough-shaper, means for conveying the heated dough from the dough-carrying member into the shaping device and means for removing the shaped dough from the shaping device.

3. In a device of the character specified, in combination, a movable conveyer, means for moving the conveyer, means for heating the conveyer, means for depositing a strip of dough upon the conveyer, means for cutting the dough strip into predetermined lengths, a dough-shaping device, means for transferring the cut dough strip into the shaping device and means for removing the shaped dough from the shaping device.

4. In a device of the character specified, in combination, a movable dough-carrying member, means for heating the dough-carrying member, means for moving the dough-carrying member, means for depositing a strip of dough upon the dough-carrying member, means for converting the dough into a sheet of predetermined thickness, means for cutting the dough strip into predetermined lengths, a dough-shaper, means for conveying the heated dough from the dough-carrying member into the shaping device and means for removing the shaped dough from the shaping device.

5. In a device of the character specified, in combination, a movable conveyer, means for moving the conveyer, means for heating the conveyer, means for depositing a strip of dough upon the conveyer, means for converting the dough into a sheet of predetermined thickness, means for cutting the dough strip into predetermined lengths, a dough-shaping device, means for transferring the cut dough strip into the shaping device and means for removing the shaped dough from the shaping device.

6. In a device of the character specified, in combination, a movable dough-carrying conveyer, means for moving the dough-carrying conveyer, a second movable member spaced from the dough-carrying conveyer, means for moving the second member, means for heating the conveyer and the second member, means for depositing a strip of dough upon the dough-carrying member, means for cutting the dough strip into predetermined lengths, a dough-shaping device, means for conveying the cut dough strip from the dough-carrying conveyer into the shaping device and means for removing the shaped dough from the shaping device.

7. In a device of the character specified, in combination, a movable dough-carrying conveyer, means for moving the dough-carrying conveyer, a second movable member spaced from the dough-carrying conveyer, means for moving the second member, means for spacing the conveyer and the second movable member at a predetermined distance from each other, means for heating the conveyer and the second member, means for depositing a strip of dough upon the dough-carrying member, means for cutting the dough strip into predetermined lengths, a dough-shaping device, means for conveying the cut dough strip from the dough-carrying conveyer into the shaping device and means for removing the shaped dough from the shaping device.

8. In a device of the character specified, in combination, a movable dough-carrying conveyer, means for moving the dough-carrying conveyer, a second movable member spaced from the dough-carrying conveyer, means for moving the second member, means whereby the second movable member will convert the dough into a sheet of predetermined thickness, means for heating the conveyer and the second member, means for depositing a strip of dough upon the dough-carrying member, means for cutting the dough strip into predetermined lengths, a dough-shaping device, means for conveying the cut dough strip from the dough-carrying conveyer into the shaping device and means for removing the shaped dough from the shaping device.

9. In a device of the character specified, in combination, a movable dough-carrying member, means for heating the dough-carrying member, means for moving the dough-carrying member, means for depositing a strip of dough upon the dough-carrying member, means for cutting the dough strip into predetermined lengths, a dough-shaper, means for conveying the heated dough from the dough-carrying member into the shaping device, means carried by the dough-shaping device whereby the dough sheet is shaped into a cone and means for removing the shaped dough from the shaping device.

10. In a device of the character specified, in combination, a movable dough-carrying member, means for heating the dough-carrying member, means for moving the dough-carrying member, means for depositing a strip of dough upon the dough-carrying member, means for converting the dough into a sheet of predetermined thickness, means for cutting the dough strip into predetermined lengths, a dough-shaper, means for conveying the heated dough from the dough-carrying member into the shaping device, means carried by the dough-shaping device whereby the dough sheet is shaped into a cone and means for removing the shaped dough from the shaping device.

11. In a device of the character specified, in combination, a movable dough-carrying conveyer, means for moving the dough-carrying conveyer, a second movable member spaced from the dough-carrying conveyer, means for moving the second member, means for heating the conveyer and the second member, means for depositing a strip of dough upon the dough-carrying member, means for cutting the dough strip into predetermined lengths, a dough-shaping device, means for conveying the cut dough strip from the dough-carrying conveyer into the shaping device, means carried by the dough-shaping device whereby the dough sheet is shaped into a cone and means for removing the shaped dough from the shaping device.

Signed at New York city, in the county of New York and State of New York, this 20th day of January, 1919.

ISAAC ISRAEL.